US011736057B2

(12) United States Patent
Geyer

(10) Patent No.: US 11,736,057 B2
(45) Date of Patent: Aug. 22, 2023

(54) ARRANGEMENT, SYSTEM AND METHOD FOR DETERMINING A TEMPERATURE OF AN ELECTRIC MACHINE

(71) Applicant: Siemens Aktiengesellschaft, Munich (DE)

(72) Inventor: Horst Geyer, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/926,501

(22) PCT Filed: May 7, 2021

(86) PCT No.: PCT/EP2021/062103
§ 371 (c)(1),
(2) Date: Nov. 18, 2022

(87) PCT Pub. No.: WO2021/233694
PCT Pub. Date: Nov. 25, 2021

(65) Prior Publication Data
US 2023/0188081 A1    Jun. 15, 2023

(30) Foreign Application Priority Data

May 20, 2020    (EP) .................................... 20175738

(51) Int. Cl.
*H02P 29/66*     (2016.01)
(52) U.S. Cl.
CPC ................... *H02P 29/664* (2016.11)
(58) Field of Classification Search
CPC ........ H02P 29/00; H02P 29/02; H02P 29/025; H02P 29/028; H02P 29/60; H02P 29/62;
(Continued)

(56) References Cited

U.S. PATENT DOCUMENTS

| 11,128,253 B1 * | 9/2021 | Colby ..................... H02P 29/66 |
| 2006/0017336 A1 | 1/2006 | Knauff |

(Continued)

FOREIGN PATENT DOCUMENTS

| DE | 103 05 368 A1 | 8/2004 |
| DE | 10 2005 004 862 A1 | 8/2006 |

(Continued)

OTHER PUBLICATIONS

PCT International Search Report and Written Opinion of International Searching Authority dated Aug. 3, 2021 corresponding to PCT International Application No. PCT/EP2021/062103 filed May 7, 2021.

*Primary Examiner* — Antony M Paul
(74) *Attorney, Agent, or Firm* — Henry M. Felereisen LLC

(57) ABSTRACT

An arrangement for determining a temperature of an electric machine includes a supply unit for operating the electric machine, with a first temperature of the electric machine computed with a first thermal model of the electric machine in the supply unit, and a computing facility connected to the supply unit by way of a data transmission channel, with a second temperature of the electric machine computed with a second thermal model of the electric machine in the computing facility. The supply unit and the computing facility communicate by way of the data transmission channel so as to enable the computing facility to determine the second temperature of the electric machine with the second thermal model even when no current is supplied to the supply unit.

21 Claims, 1 Drawing Sheet

(58) Field of Classification Search
CPC ........ H02P 29/64; H02P 29/66; H02P 29/662;
H02P 29/68; H02P 27/00; H02P 27/04;
H02P 27/06; H02P 27/08; H02P 21/00;
H02P 21/0003; H02P 21/14; H02P 21/22;
H02P 23/00; H02P 23/14; H02P 21/0017;
H02P 23/0022; H02P 6/00; H02P 6/28;
H02P 1/00; H02P 1/04; H02P 1/16; H02P
1/18; H02P 1/24; H02P 1/26; H02P 1/42;
H02P 1/46

See application file for complete search history.

(56) References Cited

U.S. PATENT DOCUMENTS

| | | |
|---|---|---|
| 2008/0094231 A1 | 4/2008 | Hohn et al. |
| 2014/0210392 A1 | 7/2014 | Berry et al. |
| 2018/0145624 A1 | 5/2018 | Kim |
| 2021/0313907 A1 | 10/2021 | Krause-Leipoldt |

FOREIGN PATENT DOCUMENTS

| | | |
|---|---|---|
| DE | 10 2009 014 703 A1 | 10/2010 |
| DE | 10 2014 100 893 A1 | 7/2014 |
| DE | 10 2016 222 633 A1 | 5/2018 |
| DE | 10 2017 207 401 A1 | 5/2018 |
| EP | 2 894 746 A1 | 7/2015 |
| EP | 3 404 810 A1 | 11/2018 |
| EP | 3 599 713 A1 | 1/2020 |

* cited by examiner

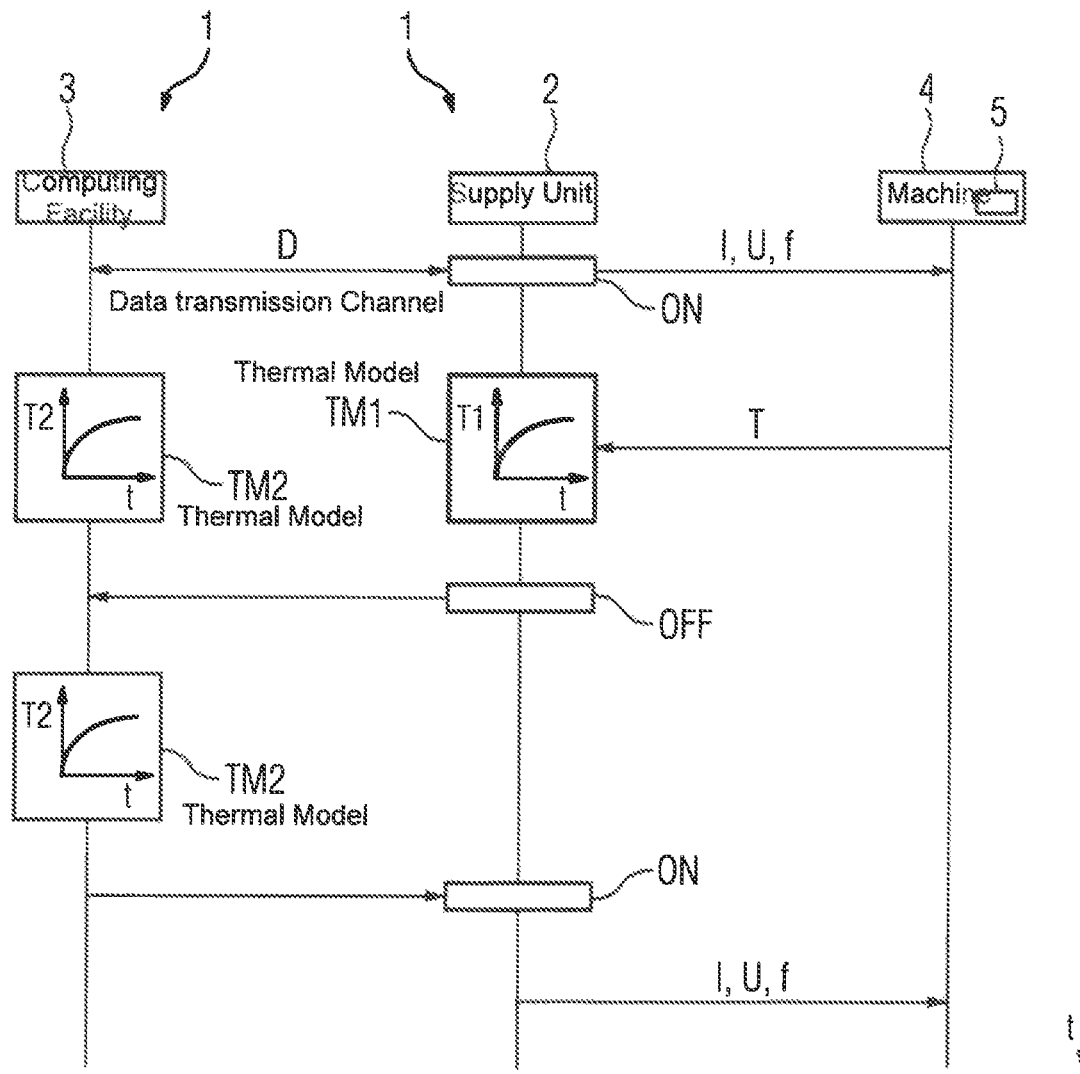

ARRANGEMENT, SYSTEM AND METHOD FOR DETERMINING A TEMPERATURE OF AN ELECTRIC MACHINE

CROSS-REFERENCES TO RELATED APPLICATIONS

This application is the U.S. National Stage of International Application No. PCT/EP20211062103, filed May 7, 2021, which designated the United States and has been published as International Publication No. WO 2021/233694 A1 and which claims the priority of European Patent Application, Serial No. 20175738.2, filed May 20, 2020, pursuant to 35 U.S.C. 119(a)-(d).

BACKGROUND OF THE INVENTION

The invention relates to an arrangement for determining a temperature of an electric machine, the arrangement comprising a supply unit for operating the machine, the supply unit being configured to determine the temperature by means of a thermal model of the electric machine.

In addition, the invention relates to a system comprising the aforementioned arrangement.

Further, the invention relates to a method for determining a temperature of an electric machine.

Furthermore, the invention relates to a computer program having commands designed for carrying out the aforementioned method.

The motor temperature (rotor temperature) Is often calculated in the software of the converter by a thermal model stored there (see, for example, DE 10 2009 014 703 A1).

Depending on whether or not the motor has a temperature sensor, different start temperatures are used for the thermal model. This is a temperature sensor which is arranged on/in the motor in such a way that it determines a temperature which serves as an initial temperature for the thermal model for the calculation of the rotor winding temperature.

In the case of motors with/without the aforementioned temperature sensor, it is possible, for example, to resort to freely parameterizable starting values and/or fixed code starting values and/or external temperatures (for example, (currently measured) ambient temperatures) as the start temperature.

The start temperatures may differ during vector operation and, for example, servo operation.

Furthermore, in the case of motors with the temperature sensor arranged as described above, the temperature currently measured with the temperature sensor can be used as the start temperature for the calculation with the thermal model.

If the motor is now supplied with current, heating occurs in the motor windings, wherein the heating can be calculated by the thermal model of the motor in the software.

The calculation of the motor temperature is very important as it is crucial for the closed-loop control to know how warm the motor is in order to be able to obtain, for example, accurate values in relation to the rotor resistance.

The problem now is when the converter is switched off. From that time, it is no longer possible to calculate the motor temperature, and information about the current temperature of the motor is no longer available when the converter is switched on again.

In the case of motors without the temperature sensor arranged as described above, the last calculated motor temperature can, for example, be stored when the drive is switched off. When the drive is switched on again, the start temperature of the thermal motor model can be equated with a proportion of the stored motor temperature (for example, 90%). Thus, for example, when the drive is switched on again after having been switched off for a very long period, a very conservative start temperature for the thermal model is expected.

In the case of motors with the aforementioned temperature sensor, no temperature of the thermal path between the temperature sensor and the rotor winding, which was calculated before the switch-off, can be taken into account. The thermal path is a model temperature which is calculated on the basis of the current operating point of the motor in the converter. The thermal path may comprise a plurality of thermal resistances and a plurality of thermal time constants.

As, for example, the rotor winding temperature (rotor temperature) can be calculated from a temperature of the temperature sensor arranged as described above and a thermal path, the information for calculating the temperature with the thermal model is also lost here when the converter is switched off.

As a result, it may happen that if the motor is supplied for a very long time (for example for hours) with current (i.e. the thermal path is very well established) and the converter is only switched off for a very short time (for example for seconds or minutes) and then switched on again immediately, the software no longer knows about the past and no longer has any information regarding the calculated thermal path.

Thus, both methods have weaknesses as both can only provide approximate information about the current motor temperature when switching on again.

Depending on whether a long or short period of time has elapsed between switching off and switching on again, the motor may have cooled down greatly or scarcely at all.

As already mentioned, however, it is important for the quality of the closed-loop control to be able to determine a motor temperature which is as accurate as possible.

One possible approach to counter the aforementioned problem is to provide a rotor temperature sensor at that point in the motor from which the temperature values for the closed-loop control are required—for example, directly in the rotor winding. When the drive is switched on again, in this case a currently measured temperature of the sensor (currently measured rotor temperature) can be used as the start temperature. In such a case, a thermal model is no longer necessary as the rotor temperature values can be directly accessed. However, such a sensor is expensive and would have to be guided outwards in a complex manner (for example, radio or slip rings) as it is usually located on a movable part of the machine.

The object of the invention can therefore be considered that of providing an arrangement, a system and a method with which the accuracy of temperature determination can be improved in a cost-saving manner.

SUMMARY OF THE INVENTION

The above-mentioned object is achieved according to the invention with an arrangement of the type mentioned in the introduction in that the arrangement further comprises a computing facility which can be or is assigned to the supply unit, the computing facility being configured to determine, preferably calculate, a temperature of the electric machine by means of a thermal model of the electric machine, the supply unit and the computing facility interacting in such a way that the computing facility determines the temperature of the electric machine at least when no current is supplied to the supply unit.

In other words, the arrangement according to the invention ensures that no information relevant to the calculation of the motor temperature by the thermal model is lost when the converter is switched off. For example, if the thermal model contains information about the calculated thermal path, this can thus continue to be used when the drive is switched on again.

It should be noted at this point that, in connection with the present invention, when "determining a temperature by means of a thermal model, at least one temperature is determined. For example, a rotor temperature and preferably additionally a stator and/or an iron temperature can be determined by means of the thermal model. The possibility of determining one or more temperatures depends on which thermal model is used specifically. For example, in the case of a 3-mass model, the rotor, the stator winding, and the motor iron are assumed to be separate thermal masses, in which case the temperature of the stator and/or the iron can be determined in addition to the rotor temperature. In a single-mass model, the motor is considered as a large thermal mass, in which case it can be assumed that the stator temperature is equal to the rotor temperature.

As a result, the temperature of the machine can be determined at any time (even if the supply unit is switched off). Thus, the supply unit (or the drive or the closed-loop control unit) can revert to a more accurate temperature after being switched on again, leading to a higher closed-loop control quality. This enables more accurate calculations of torques.

In addition, better thermal protection of the electric machine can be achieved after restarting as the temperature inside the electric machine, for example, the rotor temperature, has been determined more precisely.

Moreover, after switching off, the information about the current temperature is no longer lost. It is no longer necessary to expect very conservative initial values (90% of the last stored temperature value).

It may be expedient if the computing facility has the same thermal data as is available to the supply unit for calculating the temperature of the electric machine.

In one embodiment, it can be provided that the supply unit and the computing facility are designed to be structurally separate from one another.

It can be provided that the supply unit comprises a converter and/or an inverter and/or a frequency converter, preferably in the form of a frequency converter.

It may be advantageous if the temperature is a real-time temperature, preferably a real-time rotor temperature.

Furthermore, it may be expedient if the supply unit and the computing facility interact in such a way that, when the supply unit is supplied with current, the computing facility and/or the supply unit determine/s the temperature of the electric machine.

If, when the supply unit is supplied with current, both the computing facility and the supply unit determine the temperature of the electric machine by means of a thermal model, it is possible, for example, to validate/check/continuously monitor the sensor temperature if the machine has a temperature sensor which, for example, is arranged on/in the motor in such a way that it determines a temperature which serves as the initial temperature for the thermal model for the calculation of the rotor winding temperature. Such a temperature sensor can be arranged on an immovable part of the motor. For example, such a temperature sensor can be arranged in the winding head in the stator (for example, on the B-side). Other positions of the temperature sensor are also conceivable, such as, for example, on the motor housing, within the laminated core or in the transmitter. In response to deviations between the temperature values supplied by the supply unit and the computing facility, a user of the machine can be informed/alerted about these deviations. In addition, in response to the deviations, the temperature value determined by means of the computing facility can be used for closed-loop control of the machine if, for example, a defect of the temperature sensor should occur.

In one embodiment, it can be provided that the computing facility comprises an open-loop controller superordinate to the supply unit and/or at least one cloud component, for example, a cloud server.

Further, it can be provided that both the supply unit and the computing facility are configured to determine the temperature by means of the same thermal model, the thermal model preferably being stored on the supply unit and/or on the computing facility.

Further advantages can be obtained if the supply unit is configured to determine the temperature by means of a first thermal model, and the computing facility is configured to determine the temperature by means of a second thermal model, the second thermal model being more detailed than the first thermal model. This makes it possible to verify/check the calculation running in the supply unit more accurately.

It may be expedient if the supply unit and the computing facility can be connected, preferably are connected, via a data transmission channel.

The object of the invention is also achieved according to the invention by a system of the type mentioned at the outset in that, in addition to the aforementioned arrangement, the system comprises an electric machine.

It can be provided that the electric machine is designed as an electric rotary machine, preferably as a motor, for example as a synchronous, asynchronous or reluctance motor.

It may be expedient if the supply unit is connected to the machine.

Furthermore, it can be provided that the machine comprises a temperature sensor which is arranged in such a way on/in the motor that it determines a temperature which serves as the initial temperature for the thermal model for the calculation of the rotor winding temperature. As already mentioned, such a temperature sensor can be arranged on an immovable part of the motor. For example, such a temperature sensor can be arranged in the winding head in the stator (for example, on the B-side). Other positions of the temperature sensor are also conceivable such as, for example, on the motor housing, within the laminated core or in the transmitter.

In particular, the temperature sensor is not the aforementioned rotor temperature sensor, in other words, a sensor which is mounted at that point in the motor from which the temperature for the closed-loop control is required, and which permits a calculation without a thermal model.

Further, the object of the invention is achieved according to the invention by a method of the type mentioned at the outset in that at least when no current is supplied to a supply unit operating the electric machine, the temperature of the electric machine is determined by a thermal model of the electric machine by means of a computing facility.

The temperature calculated on the computing facility can thus be made available to the supply unit after switching on again.

In one embodiment, it can be provided that when the supply unit is supplied with current, the temperature of the electric machine is determined by means of the computing facility and/or by means of the supply unit.

If the supply unit and the computing facility calculate the motor temperature in parallel, checking of the calculated temperature values is thus also conceivable.

In addition, it may be expedient if the supply unit and/or the computing facility determines the temperature by means of the same thermal model, the thermal model preferably being stored on the supply unit and/or on the computing facility.

Further advantages can be obtained if the supply unit determines the temperature by means of a first thermal model and/or the computing facility determines the temperature by means of a second thermal model, the second thermal model being more detailed than the first thermal model.

BRIEF DESCRIPTION OF THE DRAWING

The invention is described and explained in more detail hereinafter with reference to the exemplary embodiments shown in the figures, in which:

FIG. 1 shows an arrangement, system and method for determining a temperature of an electric machine.

DETAILED DESCRIPTION OF PREFERRED EMBODIMENTS

FIG. 1 shows an arrangement 1 according to an embodiment of the invention. The arrangement comprises a supply unit 2 and a computing facility 3. The supply unit 2 is structurally separate from the computing facility 3.

The supply unit 2 is designed as a converter which is provided for operating an electric machine 4. The electric machine 4 can be, for example, an electric rotary machine, in particular a motor, for example, a synchronous, an asynchronous or a reluctance motor. In this way, the supply unit 2 can serve for the open-loop control and supply I, U, f of the electric machine 4.

The supply unit 2 can also be designed, for example, as an inverter, a frequency converter or can include those.

The computing facility 3 can be designed as an open-loop controller superordinate to the supply unit 2 or as a cloud component, for example a cloud computing unit, or can include those.

The arrangement 1 is configured for determining, in particular for calculating (at least) one temperature T1, T2 of the electric machine 4 and can be part of a system comprising the electric machine 4 for determining the temperature T1, T2 of the machine 4.

The computing facility 3 is assigned to the supply unit 2 and is connected, for example, to the supply unit 2 via a data transmission channel in order to exchange data D.

The supply unit 2 and the computing facility 3 are configured to calculate the temperature or temperature values T1, T2 of the machine 4.

The supply unit 2 can calculate the temperature T1 by means of a first thermal model TM1 of the machine 4 stored/deposited in the supply unit 2.

The computing facility 3 can calculate the temperature T2 by means of a second thermal model TM2 of the machine 4 stored/deposited in the computing facility 3.

The electric machine 4 can optionally comprise a temperature sensor 5 which can provide a temperature input value T necessary for the calculation with the thermal model TM1, TM2. The temperature sensor 5 is arranged on/in the motor in such a way that it determines a temperature T which serves as the initial temperature for the thermal model TM1, TM2 for the calculation of the rotor winding temperature. Such a temperature sensor 5 is preferably arranged on an immovable part of the motor. For example, such a temperature sensor 5 can be arranged in the stator winding on a B-side winding head of the motor (B-side or "Non-Drive End"). In this arrangement of the temperature sensor 5, for example, the thermal path can be calculated simply and accurately.

FIG. 1 shows that the thermal models—a first thermal model TM1 and a second thermal model TM2—may be different. However, they may also be identical.

The computing facility 3 preferably has the same thermal data available as is available to the converter 2 for calculating the motor temperature T1. The converter 2 can transmit this data D, for example, to the computing facility 3 via the data transmission channel.

The converter 2 and the computing facility 3 interact in such a way that the computing facility 3 determines the temperature T2 of the electric machine 4 at least when no current is supplied to the converter 2. This ensures that the temperature T1, T2 of the electric machine 4 is also converted when the converter 2 and the machine 4 are switched off.

The temperature T1, T2 is a (calculated) current temperature or real-time-temperature, preferably a real-time rotor temperature.

While the converter 2 (and preferably the machine 4) is (are) in operation (between "ON" and "OFF" In FIG. 1), the temperature T1 can be determined, for example, only by the (first) thermal model TM1 on the converter 2. A time evolution is shown with an arrow pointing downwards in the image plane and labeled t".

The converter 2 and the computing facility 3 can interact in such a way that the calculation of the temperature T2 by the computing facility 3 only takes place if the converter 2 is not supplied with current. In this case, when switching off, the converter 2 can send a corresponding signal to the computing facility 3, for example, and transfer the calculation of the temperature to the computing facility 3, which immediately undertakes calculation of the temperature on behalf of the converter 2.

FIG. 1 also shows that the calculation of the temperature T2 by means of the computing facility 3 can also be carried out when the converter 2 is supplied with current and, for example, calculates the temperature T1 in accordance with the first thermal model TM1. This can, for example, simplify the communication between the converter 2 and the computing facility 3.

By calculating the temperature in the converter 2 and in the computing facility 3 in parallel—whether with the same thermal model (TM1=TM2) or with different thermal models TM1, TM2—it may be possible, for example, to validate/check the sensor temperature T if the machine has the temperature sensor 5. In response to deviations between the temperature values supplied by the converter 2 and the computing facility 3, a user of the machine 4 can be informed/alerted about these deviations. In addition, in response to the deviations, the temperature value determined by means of the computing facility 3 can be used for closed-loop control of the machine 4 if, for example, a defect of the temperature sensor 5 should occur.

The second thermal model TM2 with which the computing facility 3 calculates can, for example, be more detailed than the first thermal model TM1 with which the converter 2 calculates. This enables more precise verification/checking of the calculation running in the supply unit.

In other words, the temperature T1 (first temperature) calculated with the first thermal model TM1 may deviate from the temperature T2 (second temperature) calculated with the second thermal model TM2.

If, for example, the calculation in the computing facility 3 takes place in parallel with the calculation in the converter 2 in order to save computing time on the converter 2, only the first (simplified) thermal model TM1 can be calculated for the motor 4 and the converter 2. The first thermal model TM1 can offer a sufficiently high degree of accuracy to thermally protect the drive 2 (the converter) reliably.

The calculation of the more detailed second model TM2 on the computing facility 3 can be advantageous, for example, for the reason that heating of the sensor temperature (virtual sensor temperature) can also be calculated. In this way, it is possible, for example, to determine on the basis of a current operating point of the electric machine whether the measured sensor temperature is also suitable, in other words, meets certain requirements.

This virtual sensor temperature can then be compared with the actually measured sensor temperature. If these values deviate from one another, this may indicate—depending on how great the deviation is—a defect of the real sensor 5.

It is then possible for the drive 2 to alert a user that the motor temperature sensor may possibly be defective, and/or for the calculated virtual sensor temperature to be used for a further calculation of the temperature T2 of the rotor winding.

This makes it possible to monitor the sensor temperature and also to provide a virtual sensor temperature T2 by means of the computing facility 3 in an emergency.

Further, the temperature T2 calculated with the more detailed thermal model TM2 can be constantly/continuously compared with the temperature T1 calculated in the drive 2 by means of the (simpler) thermal model TM1. If excessively large deviations between the two temperatures T1 and T2 are now detected, this may indicate the incorrect design of the simplified model TM1. This makes it possible to improve the first thermal model TM1.

FIG. 1 thus shows an embodiment of a system for determining a temperature of an electric machine 4, the system comprising the arrangement 1 and the electric machine 4, the converter 2 of the arrangement 1 being connected to the motor 4.

Further, FIG. 1 shows an embodiment of a method for determining a temperature T1, T2 of an electric machine 4. As already described, the temperature T1, T2 of the electric machine 4 is calculated by a thermal model TM1, TM2 by means of the computing facility 3 at least when the converter 2 operating the electric machine 4 is not supplied with current.

When the converter 2 is supplied with current, the calculation of the temperature T1, T2 can be calculated both on the converter 2 and on the computing facility 3.

If the converter 2 is put back into operation, "ON", after switching off, "OFF", the temperature T2 calculated on the computing facility 3 can be transferred to the converter 2. From that time, the calculation can continue on the converter 2 and/or on the computing facility 3. This can depend, for example, on the available computing resources, on the utilization of the data connection channel between the converter 2 and the computing facility 3, etc.

As already explained, the converter 2 and the computing facility 3 can calculate the temperature T1, T2 by means of the same thermal model or by means of the different models TM1, TM2. In this case, the respective thermal model TM1, TM2 can be stored on the converter 2 or on the computing facility 3, for example in a volatile memory of the converter 2 and in a non-volatile memory of the computing facility 3.

The computing facility 3 may further comprise a computer program with commands which have the effect that, for example, the method described above is carried out in the arrangement 1 or in the system. The computer program can be present, for example, in the form of software, for example, open-loop control software or a cloud app.

Although the invention has been illustrated and described in detail by exemplary embodiments, the invention is not limited by the disclosed examples. Variations thereof may be derived by a person skilled in the art without departing from the scope of the invention as defined by the following claims. In particular, the method described can be improved by features which have been described or claimed with regard to the arrangement and/or the system and vice versa.

What is claimed is:

1. An arrangement for determining a temperature of an electric machine, the arrangement comprising:
a supply unit for operating the electric machine, the supply unit comprising a first thermal model of the electric machine stored in the supply unit, with the first thermal model computing a first temperature of the electric machine, and
a computing facility connected to the supply unit by way of a data transmission channel, the computing facility comprising a second thermal model of the electric machine stored in the computing facility, with the second thermal model computing a second temperature of the electric machine,
wherein the supply unit and the computing facility communicate by way of the data transmission channel so as to enable the computing facility to determine the second temperature of the electric machine with the second thermal model even when no current is supplied to the supply unit.

2. The arrangement of claim 1, wherein the supply unit comprises a converter, an inverter or a frequency converter.

3. The arrangement of claim 2, wherein the supply unit is designed as a frequency converter.

4. The arrangement of claim 1, wherein the first temperature and the second temperature is a real-time-temperature.

5. The arrangement of claim 4, wherein the first temperature and the second temperature is a real-time rotor temperature.

6. The arrangement of claim 1, wherein when current is supplied to the supply unit, the first temperature and the second temperature of the electric machine is determined by the computing facility or the supply unit, or both.

7. The arrangement of claim 1, wherein the computing facility comprises an open-loop controller superordinate to the supply unit or at least one cloud component, for example, a cloud server.

8. The arrangement of claim 1, wherein the first thermal model and the second thermal model are identical.

9. The arrangement of claim 8, wherein the first thermal model is stored in a volatile memory of the supply unit and the second thermal model is stored in a non-volatile memory of the computing facility.

10. The arrangement of claim 1, wherein the second thermal model is more detailed than the first thermal model.

11. The arrangement of claim 1, wherein the computing facility and the supply unit receive identical thermal data of the electric machine for calculating the first and second temperatures.

12. The arrangement of claim 1, wherein the supply unit and the computing facility are constructed as separate units.

13. A system comprising:
an electric machine, and
an arrangement for determining a temperature of the electric machine, as claimed in claim 1.

14. The system of claim 13, wherein the electric machine is designed as an electric rotary machine, preferably as an electric motor, for example, as a synchronous, asynchronous or reluctance motor.

15. The system of claim 13, wherein the electric machine comprises a temperature sensor arranged on or in the motor and supplying to the first or second thermal model, or both, a machine temperature serving as an initial temperature for the first or second thermal model for calculating a rotor winding temperature, wherein the temperature sensor is preferably arranged on an immovable part of the electric machine, for example, on a winding head side in a stator winding.

16. A computer program stored on a non-volatile computer-readable medium and comprising commands, which when read into a memory of a processor in a supply unit or in a computing facility, cause the arrangement of claim 1 to determine a temperature of an electric machine, when no current is supplied to a supply unit operating the electric machine, with a thermal model of the electric machine in a computing facility, which is connected for data exchange with the supply unit.

17. A method for determining a temperature of an electric machine, comprising:
when no current is supplied to a supply unit operating the electric machine, determining the temperature of the electric machine with a thermal model of the electric machine in a computing facility, which is connected for data exchange with the supply unit.

18. The method of claim 17, wherein when current is supplied to the supply unit, determining the temperature of the electric machine with the thermal model of the electric machine in the computing facility or in the supply unit.

19. The method of claim 17, wherein the supply unit and the computing facility determine the temperature of the electric machine using an identical thermal model.

20. The method of claim 18, wherein the thermal model is stored in the supply unit or in the computing facility, or both.

21. The method of claim 19, wherein the supply unit determines the temperature by means of a first thermal model and the computing facility determines the temperature by means of a second thermal model, wherein the second thermal model is more detailed than the first thermal model.

* * * * *